US008457318B2

(12) United States Patent
Günther

(10) Patent No.: US 8,457,318 B2
(45) Date of Patent: Jun. 4, 2013

(54) METHOD AND SYSTEM FOR CONTINUOUSLY TRANSMITTING ENCRYPTED DATA OF BROADCAST SERVICE TO MOBILE TERMINAL

(75) Inventor: Christian Günther, Neubiberg (DE)

(73) Assignee: Siemens Aktiengesellschaft, Munich (DE)

( * ) Notice: Subject to any disclaimer, the term of this patent is extended or adjusted under 35 U.S.C. 154(b) by 485 days.

(21) Appl. No.: 12/310,886

(22) PCT Filed: Sep. 7, 2007

(86) PCT No.: PCT/EP2007/059365
§ 371 (c)(1),
(2), (4) Date: Mar. 11, 2009

(87) PCT Pub. No.: WO2008/031762
PCT Pub. Date: Mar. 20, 2008

(65) Prior Publication Data
US 2009/0282246 A1    Nov. 12, 2009

(30) Foreign Application Priority Data
Sep. 11, 2006  (DE) .......................... 10 2006 042 554

(51) Int. Cl.
*H04L 9/08*  (2006.01)
*H04W 36/00*  (2009.01)

(52) U.S. Cl.
USPC ............ 380/278; 380/281; 455/436; 370/331

(58) Field of Classification Search
USPC .. 380/277, 278, 281–282, 284–285; 370/331; 455/436
See application file for complete search history.

(56) References Cited

U.S. PATENT DOCUMENTS 6,370,380 B1 *  4/2002  Norefors et al. .............. 455/436
7,792,527 B2 *  9/2010  Wu et al. .................... 455/435.1
(Continued)

FOREIGN PATENT DOCUMENTS

CN    1547836       11/2004
EP    1 422 875 A2   5/2004
(Continued)

OTHER PUBLICATIONS

Kim et al., "New Authentication Mechanism for Vertical Handovers between IEE 802.16e and 3G Wireless Networks", International Journal of Computer Sciense and Network Security, vol. 6 No. 9B, Sep. 2006 http://paper.ijcsns.org/07_book/200609/200609B20.pdf.*

(Continued)

*Primary Examiner* — Jung Kim
*Assistant Examiner* — Carlos M De Jesus, Jr.
(74) *Attorney, Agent, or Firm* — Staas & Halsey LLP

(57) ABSTRACT

In service access networks having different key hierarchies that provide broadcast service to a mobile terminal, when switching from a first service access network, from which the mobile terminal receives the data of the broadcast service in an encrypted manner by a first data content encryption key, to a second service access network, from which the mobile terminal receives the data of the same broadcast service in an encrypted manner by a second data content encryption key, the mobile terminal receives a key of the hierarchy of the second service access network which is encrypted by a user-specific key of the first service access network.

20 Claims, 8 Drawing Sheets

Message flow for the exemplary embodiment 3GPP MBMS → DVB-H 18Crypt

U.S. PATENT DOCUMENTS

| | | | | |
|---|---|---|---|---|
| 2002/0174335 A1* | 11/2002 | Zhang et al. | | 713/168 |
| 2003/0115460 A1* | 6/2003 | Arai | | 713/168 |
| 2005/0008159 A1* | 1/2005 | Grilli et al. | | 380/270 |
| 2005/0154895 A1 | 7/2005 | Zhang | | |
| 2005/0278524 A1 | 12/2005 | Diehl et al. | | |
| 2006/0128362 A1* | 6/2006 | Bae et al. | | 455/411 |
| 2006/0193272 A1* | 8/2006 | Chou et al. | | 370/310 |
| 2007/0064647 A1* | 3/2007 | Prasad | | 370/331 |

FOREIGN PATENT DOCUMENTS

| | | | |
|---|---|---|---|
| GB | 2 423 221 A | | 8/2006 |
| JP | 2002537739 | | 11/2002 |
| JP | 2006-51447 | * | 4/2006 |
| JP | 2006-514447 | | 4/2006 |
| WO | 00/49827 | | 8/2000 |
| WO | WO 03/019899 | | 3/2003 |
| WO | WO2004027637 | * | 4/2004 |
| WO | 2005/020544 A1 | | 3/2005 |

OTHER PUBLICATIONS

"IP datacast over DVB-H: Service Purchase and Protection" Dec. 2005, applicant provided.*

Machine translation of JP 2006-514447, accessed on Jan. 11, 2013 http://dossier1.ipdl.inpit.go.jp/AIPN/odse_call_transl.ipdl?N0000=7413&N0005=Ei7BzenZVnBvfz7D1ZIK&N0120=01&N2001=2&N3001=2006-514447&Ntt3=&Ntt4=&Ntt5=&Ntt6=&Ntt7=&Ntt8=&Ntt9=&Ntt10=&Ntt11=&Ntt12=.*

IP Datacast over DVB-H: Service Purchase and Protection (SPP); Digital Video Broadcasting (DVB) Document A100, Dec. 2005; pp. 1-278.

German Office Action for Application No. 10 2006 042 554.5; dated Jul. 2, 2007.

International Search Report for Application No. PCT/EP2007/059365; mailed Feb. 6, 2008.

Japanese Office Action dated Dec. 2, 2011 issued in corresponding Japanese Patent Application No. 2009-527788.

Chinese Office Action dated Dec. 23, 2011 issued in corresponding Chinese Patent Application No. 200780033649.1.

* cited by examiner

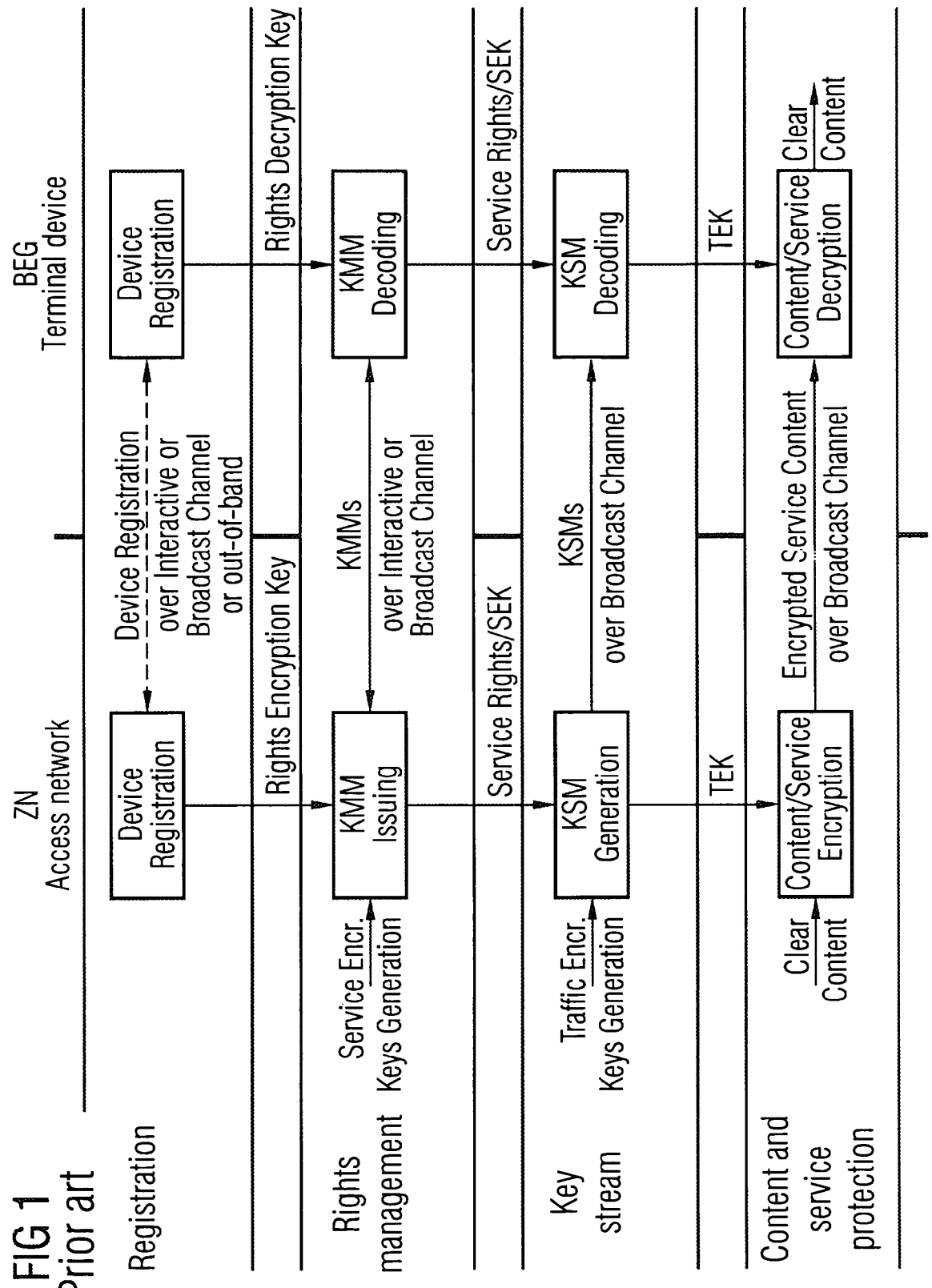

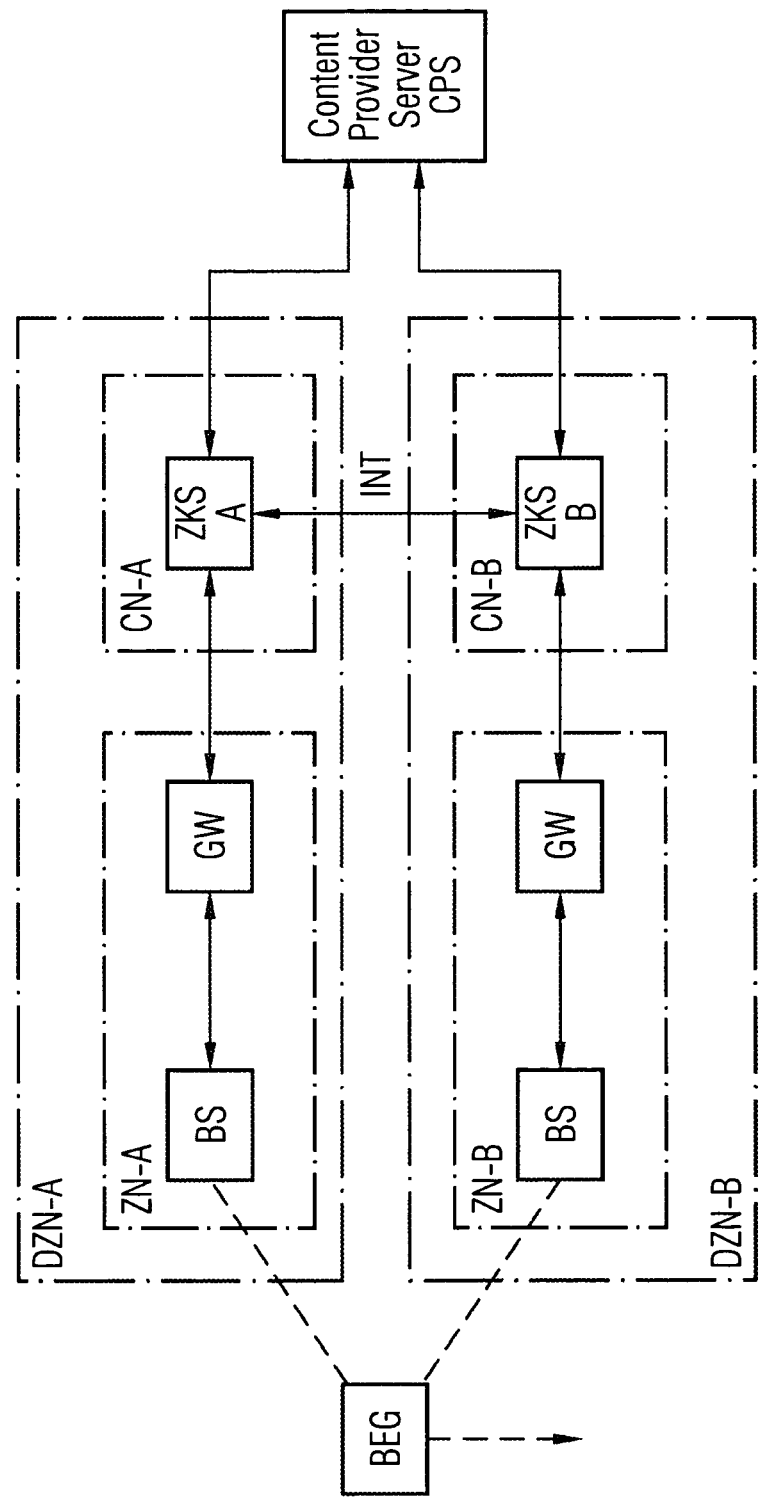

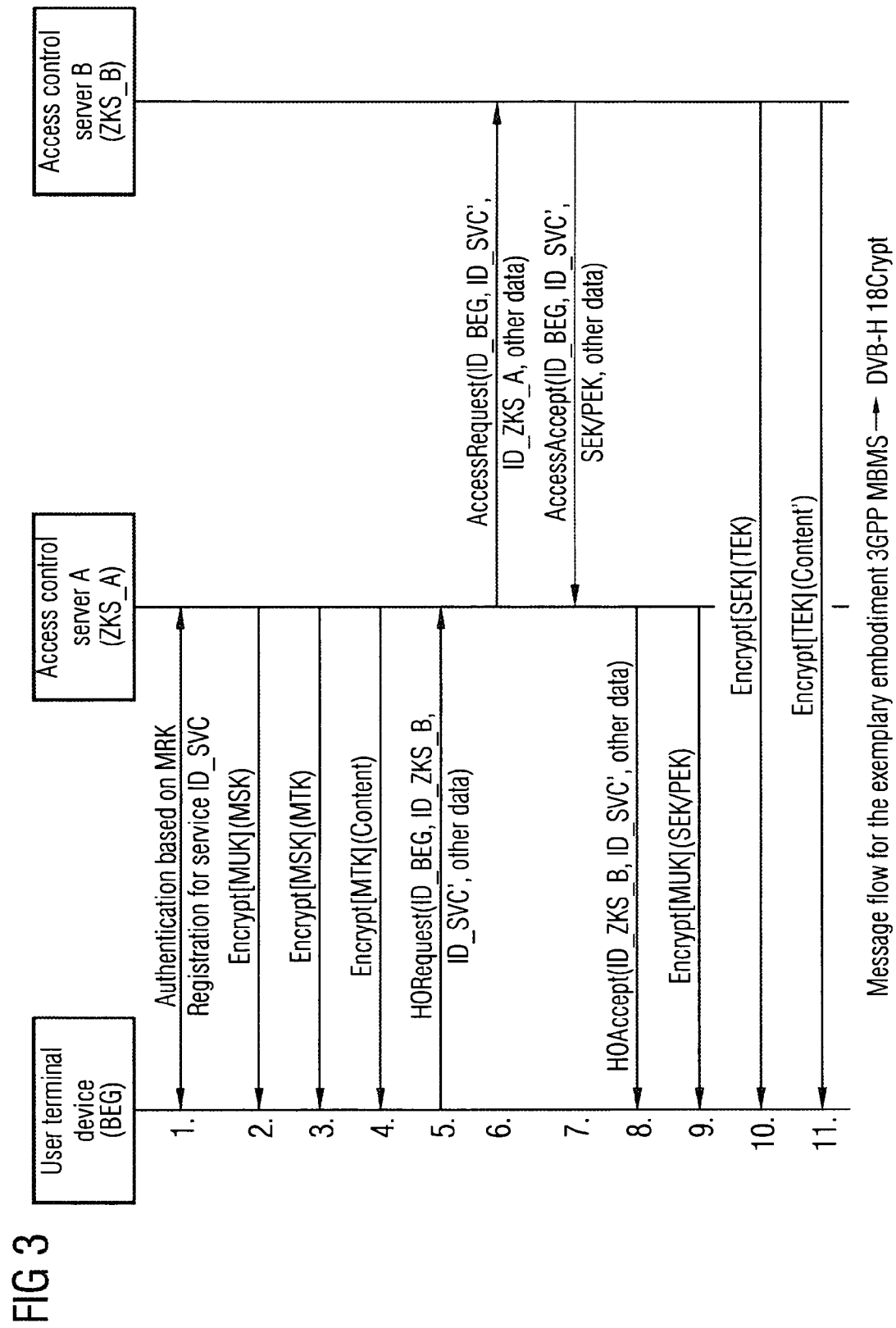

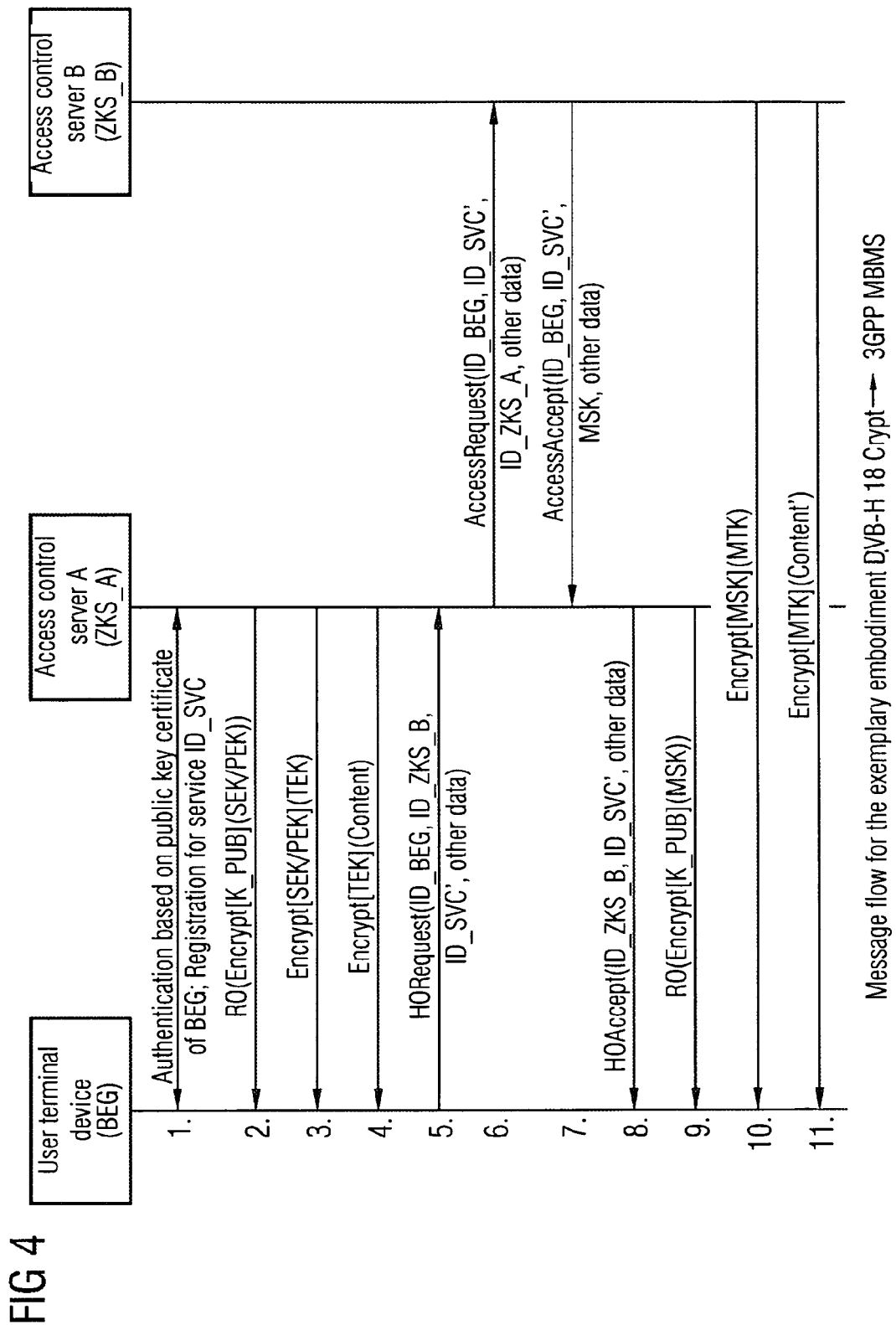

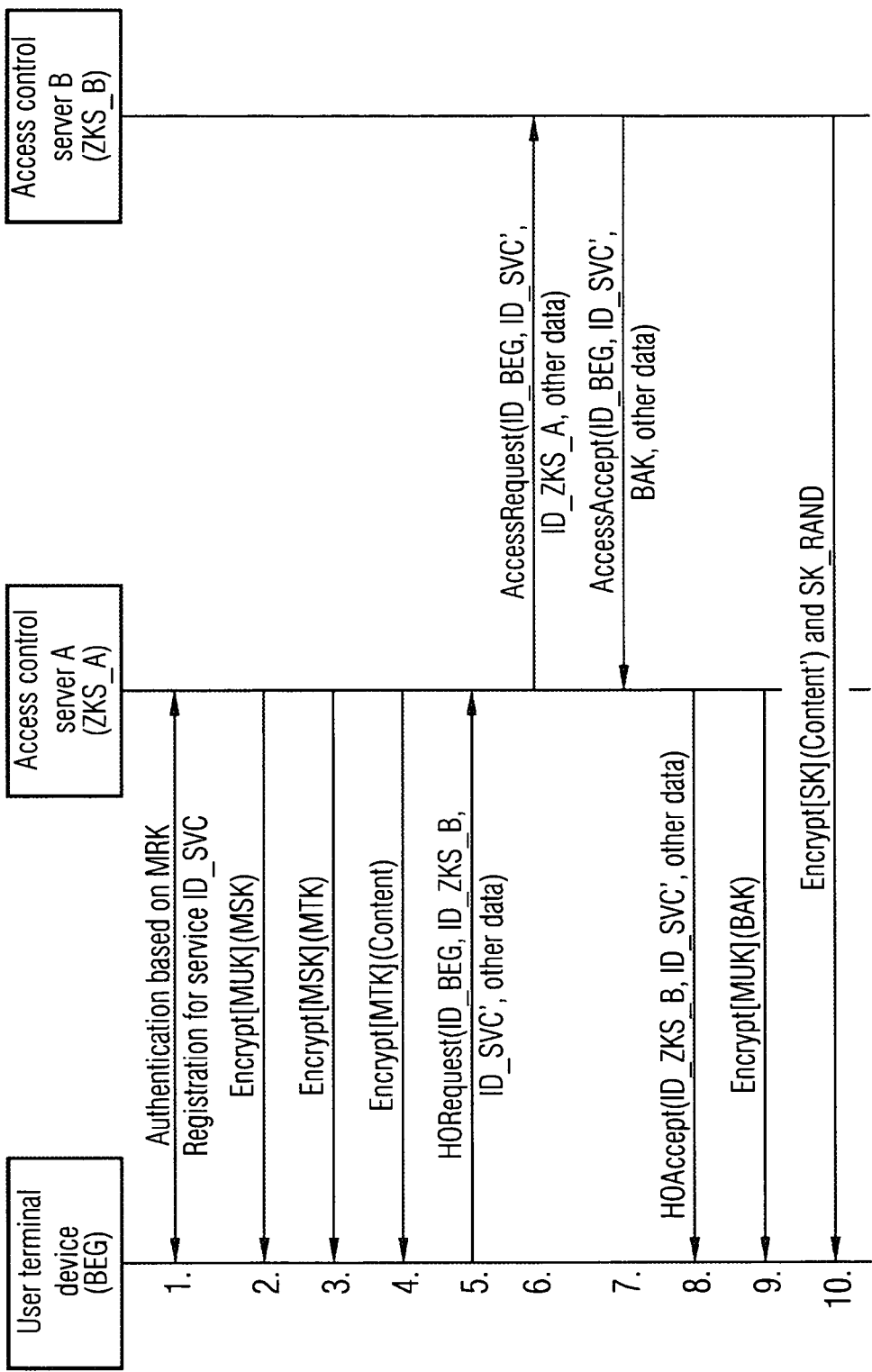

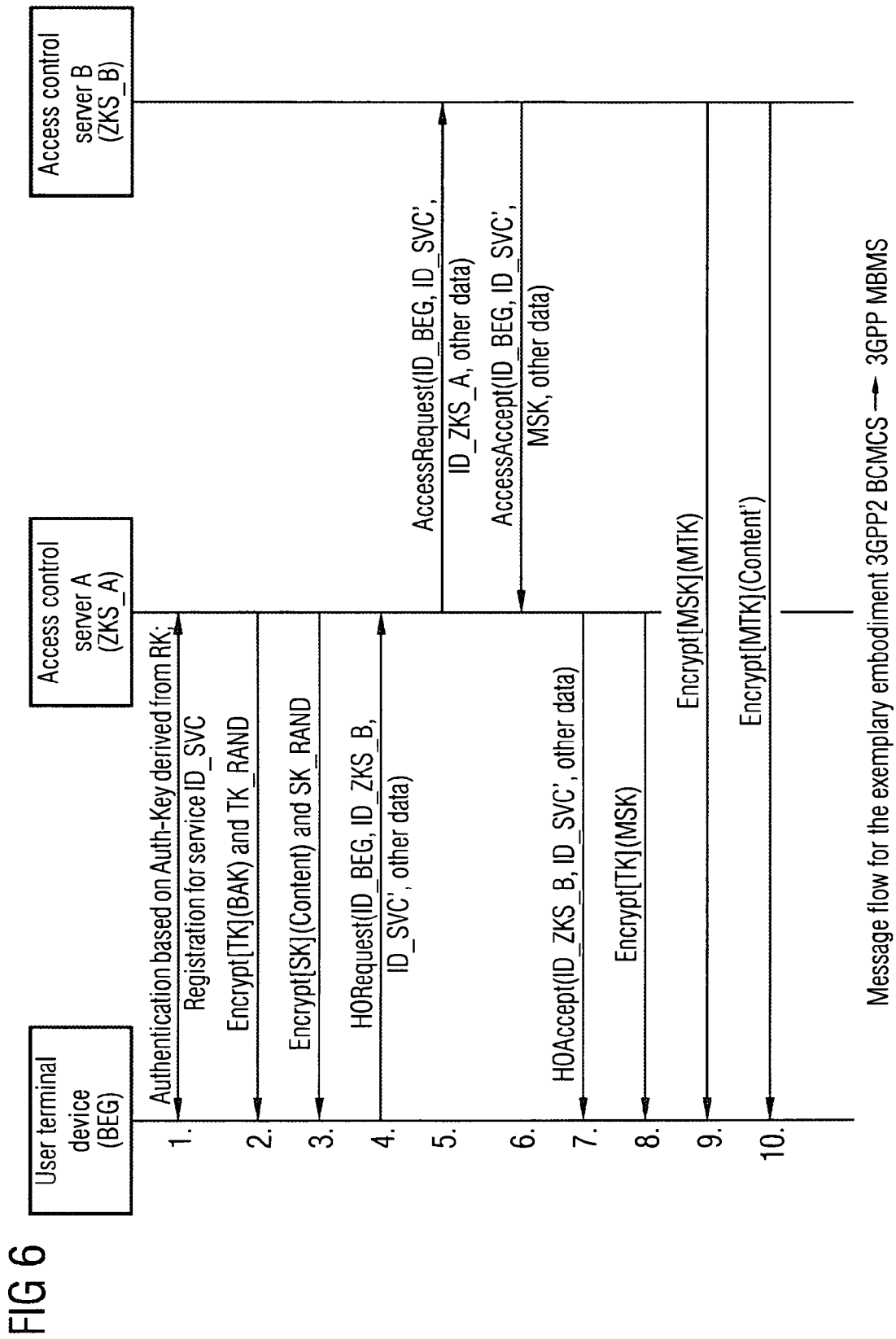

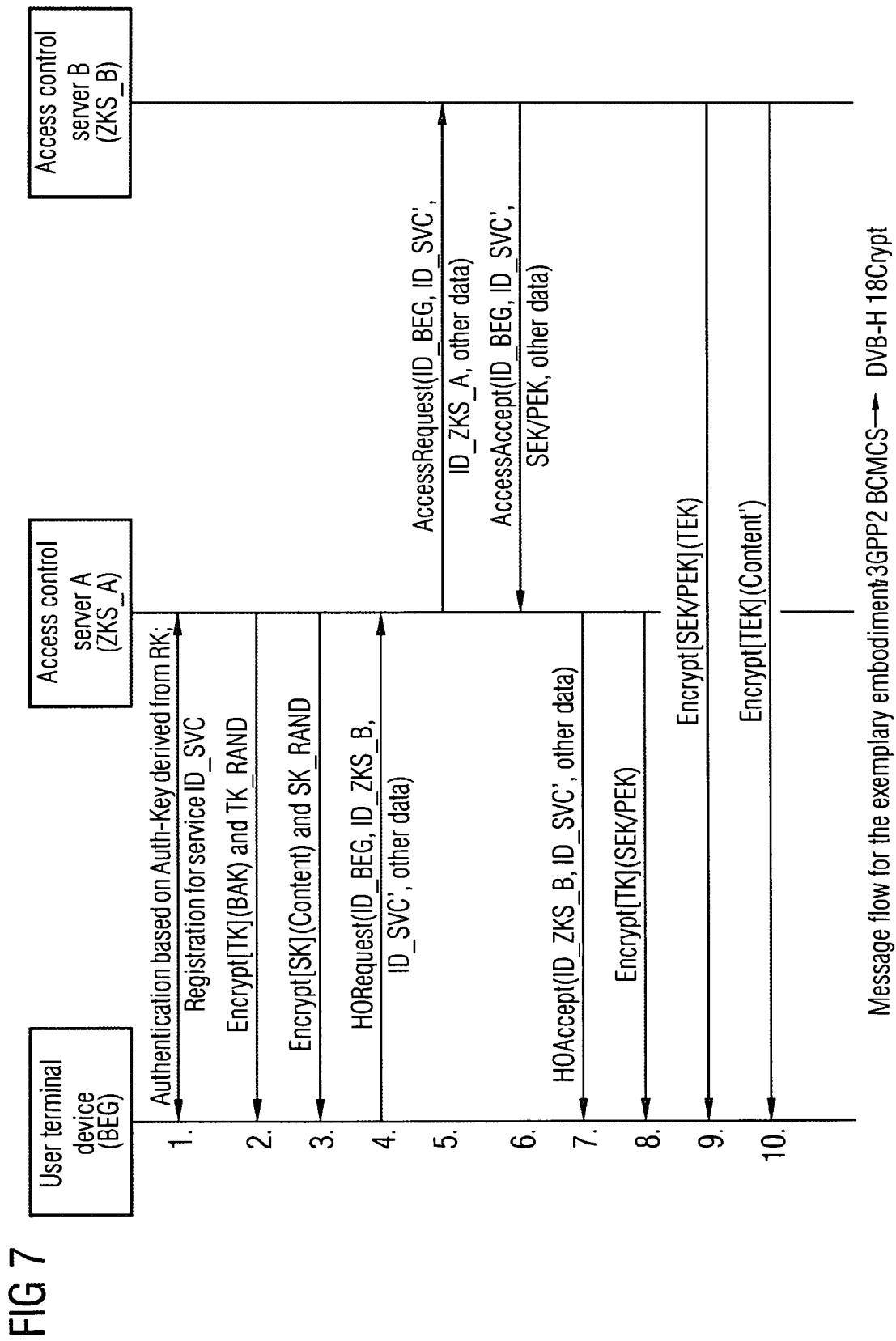

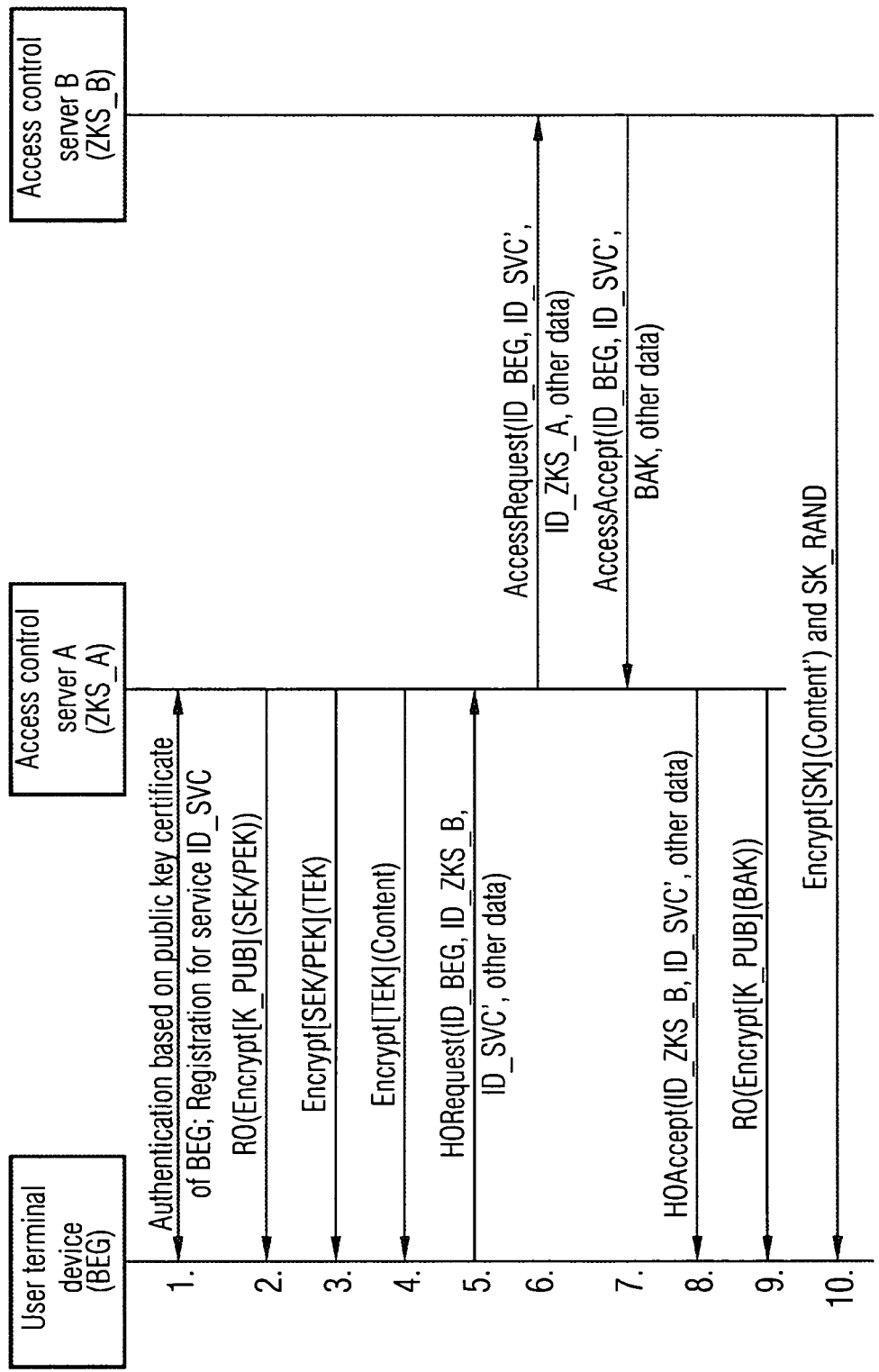

METHOD AND SYSTEM FOR CONTINUOUSLY TRANSMITTING ENCRYPTED DATA OF BROADCAST SERVICE TO MOBILE TERMINAL

CROSS REFERENCE TO RELATED APPLICATIONS

This application is based on and hereby claims priority to German Application No. 10 2006 042 554.5 filed on Sep. 11, 2006, the contents of which are hereby incorporated by reference.

BACKGROUND

Described below is a method and system for continuously transmitting encrypted data of a broadcast service to a mobile terminal that changes over from a service access network having a first key hierarchy to another service access network having a second key hierarchy.

With point-to-multipoint data services, multimedia data in particular such as, for instance, audio and video data is transmitted to a terminal by a content or service provider's server. If the terminal is a mobile terminal or user terminal BEG such as, for example, a mobile telephone or laptop the data will be transmitted by the service provider's server via a service access network DZN and from there to the mobile terminal over a radio interface. Various multicast or access technologies are known that each employ different procedures for authenticating and registering users, thereby controlling access to the multicast or broadcast services. Examples of the kind of known broadcast technologies are the Multimedia Broadcast and Multicast System (MBMS) specified in the 3GPP (Third Generation Partnership Project), the DVB-H (Digital Video Broadcast to Handhelds) system based on the IP Internet Protocol and abbreviated to DVB-H IPDC (DC: Data Cast), the 3GPP2 BCMCS (Third Generation Partnership Project 2 Broadcast Multicast Service) system, and the OMA BCAST (Browser and Content Broadcast) of the standardizing body of the Open Mobile Alliance (OMA). The different access technologies for provisioning broadcast or multicast services for mobile terminals employ in particular different key hierarchies for encrypting data transmission links.

The different service access networks have partially overlapping coverage areas so that a mobile terminal can move from a first service access network's coverage or transmission area to a transmission area of a second service access network having a different access technology. Mobile terminals or user terminals BEG are able to support different access technologies for receiving the corresponding broadcast services.

The Multimedia Broadcast Multicast System (MBMS) specified by the Third Generation Partnership Project (3GPP) standardizing body implements IP-based point-to-multipoint data services in 3GPP mobile radio networks (3GPP MBMS ARC). Examples of data services of the type are audio, video and voice services (streaming services), but also services with the aid of which images and texts are beamed to terminals (downloading and what are termed carousel services). Alongside the Radio Access Network (RAN) and Serving and Gateway GPRS Support Nodes (SGSN and GGSN), the user terminal (User Equipment—UE) and the Broadcast Multicast Service Center (BM-SC) are the most important MBMS network components. The actual data content is made available to the BM-SC by a Content Provider (ContProv).

MBMS streaming services in the case of which unauthorized use is to be prevented can be encrypted with the aid of the Secure Realtime Transport Protocol (SRTP) and protected against being changed (integrity protection). That function is assumed by the BM-SC (3GPP MBMS SEC). Cryptographic key material must be made available for that purpose at the BM-SC and at the appropriately authorized user terminals (UE). For reasons of efficiency a specific MBMS streaming service cannot be separately protected and radiated for each individual terminal; rather it is the case that the BM-SC and authorized terminals share what are termed MBMS traffic keys (MTK). Although changing frequently, MTKs are not specific to a particular terminal.

MTKs are encrypted with the aid of what are termed MBMS Service Keys (MSK) so that they cannot themselves be intercepted on their way from the BM-SC to the mobile terminals BEG. MSKs are much longer-lived than MTKs and so have to be transmitted less frequently to the UEs than MTKs. MSKs must of course also be protected from interception while being transported to the BEGs. That is achieved with the aid of what are termed MBMS user keys (MUK). In contrast to MTKs and MSKs, an individual MUK is valid only for a single terminal BEG. That also means that an MSK that is radiated encrypted by a specific MUK can be decrypted only by the terminal BEG that knows the MUK.

MUKs are negotiated between the terminal BEG and BM-SC with the aid of what is termed the Generic Bootstrapping Architecture (GBA). The GBA is a method specified by the 3GPP for deriving a security relationship between the terminal BEG and what is termed a Network Application Function (NAF) from the security relationship existing in any event between the terminal BEG and mobile radio network (3GPP GBA). In association with the MBMS the BM-SC assumes the role of the NAF.

Independently of the MBMS, the terminal BEG and a Home Subscriber Server (HSS) in the BEG's home network share a long-lived, secret key K stored on the BEG's Universal Integrated Circuit Card (UICC) and in a database of the HSS server. The terminal BEG and the GBA component responsible therefor having the name Bootstrapping Server Function (BSF) mutually authenticate themselves on the basis of the key K. The HSS server therein supplies the BSF with the relevant, in part terminal-specific data (Zh, reference point). In association with the authenticating the terminal BEG and the BSF derive a secret key Ks serving to generate a key Ks_NAF that depends on the identity of the NAF. The bootstrapping server BSF informs the NAF (the BM-SC in the MBMS example) of the Ks_NAF (Zn reference point) on request so that the terminal and NAF will then share a secret cryptographic key, namely the Ks_NAF. Thus a security relationship will be established overall between the terminal UE or BEG and the NAF (key Ks_NAF) based on the existing security relationship between the terminal and mobile radio network (key K).

In the case of the MBMS the terminal and BM-SC derive from the Ks_NAF what is termed an MBMS Request Key (MRK) with the aid of which the terminal authenticates itself to the BM-SC (Ua reference point). The UE will thereby obtain the authorization to receive a specific MBMS service. The authorization causes the BM-SC to send the terminal an MBMS Service Key (MSK) encrypted with the aid of an MBMS User Key (MUK) derived from the MRK. As already mentioned above, only the terminal having the MUK derived from the MRK will then be able to decrypt the MSK. However, with the aid of the MSK the terminal will be able to decrypt the non-terminal-specific MBMS Traffic Keys (MTK) and hence the entire, SRTP-protected MBMS streaming service and check the data's integrity. The security of the 3GPP MBMS is thus based on the following key hierarchy:

Long-lived 3GPP key K
  known only to the BEG and an HSS in the BEG's or UE's home network
  serves in the case of the GBA for authenticating between the BEG and BSF GBA keys Ks and Ks_NAF
Ks is derived in association with the GBA authentication procedure between the BEG and the BEG's home network and serves to generate the key Ks_NAF
the keys MRK and MUK are in the case of the MBMS derived from the Ks_NAF
MBMS Request Key (MRK)
  derived by the BEG and BM-SC from the Ks_NAF
  serves to authenticate the BEG to the NAF=BM-SC and authorize it there during service registering
MBMS User Key (MUK)
  derived from the Ks_NAF
  serves to perform BEG-specific encrypting of the MSK
MBMS Service Key (MSK)
  generated by the BM-SC for a specific service
  serves to encrypt MTKs during transportation to the BEGs
  is valid longer than MTKs
MBMS Traffic Keys (MTK)
  keys generated by the BM-SC for protecting (encryption and integrity protection) an MBMS service
  not BEG-specific
  are transmitted to BEGs encrypted with the aid of the MSK The Digital Video Broadcast (DVB) standardizing body has published specifications that define video broadcast services to mobile terminals BEG (DVB to handhelds—DVB-H) based on the Internet Protocol (IP): IP Data Cast over DVB-H, abbreviated to IPDC/DVB-H (DVB IPDC). The DVB-H system therein does not just have a unidirectional broadcast channel but also an optional bidirectional interactive channel that can be realized by, for example, a 3GPP mobile radio network.

The DVB-H document "IP Data Cast over DVB-H: Service Purchase and Protection" (DVB IPDC SPP) specifies two different security systems for DVB-H services:
  System 1: Open Security Framework (OSF)
  recommends the encrypting of broadcast services at the data content level (ISMACryp)
  System 2: 18Crypt
  recommends the encrypting of broadcast services at the transport level (SRTP) or network level (IPSec)

User terminals BEG corresponding to the SPP specification must support all three encryption methods (ISMACryp, SRTP, IPSec) and implement at least one of the two systems.

FIG. 1 shows a DVB-H model for protecting data content in the case of broadcast services according to the related art.

The terminal BEG (Device) initially requires a long-lived key K that is unambiguous for that device. A key of the type will as a rule already be located on the device when purchased or else on a chip card that is inserted into the device. The key forms the basis of the security of the four layers, which are shown in FIG. 1.

At the topmost layer (Registration) the terminal (Device) authenticates itself with the aid of an unambiguous key K and registers for a specific broadcast service. On the basis of successful authenticating and registering the terminal obtains a cryptographic key (Rights Encryption Key) necessary for receiving the service. The Rights Encryption Key is encrypted with the aid of the device-specific key K so that only the terminal that has the key K will be able to decrypt the Rights Encryption Key.

At the second layer (Rights Management) the terminal obtains a Service Encryption Key (SEK) that is valid for longer and is transmitted to the terminal with the aid of a Key Management Message (KMM). The SEK is unambiguous for the broadcast service but not for the terminal. The Rights Encryption Key serves to encrypt the SEK. The SEK is comparable in terms of its functionality to the 3GPP-MBMS Service Key (MSK).

At the third layer (Key Stream) what are termed Key Stream Messages (KSM) transport short-lived Traffic Encryption Keys (TEK) to the terminals via the broadcast channel. The TEKs are therein encrypted by the Service Encryption Key (SEK) previously transmitted at the second layer. At the bottommost layer (Content/Service Protection) the broadcast service—encrypted with the aid of the TEKs—is radiated via the broadcast channel.

With the aid of its device-specific key K the terminal is able to decrypt the Rights Encryption Key and hence in turn the SEK and then the frequently changing TEKs. The registered and consequently authorized terminal BEG will hence be able to display the encrypted broadcast service in plain-text form.

The model shown in FIG. 1 describes the technical realization of the protective measures of IPDC/DVB-H at a very general level. That is because, on the one hand, the model indicated in [DVB IPDC SPP] represents the two, very different systems "Open Security Framework" and "18Crypt" in a uniform manner and, on the other hand, the technical realization of layers 1-3 (Registration, Rights Management, and Key Stream) is not explicitly specified in [DVB IPDC SPP] for the Open Security Framework system but instead left open—in contrast to the 18Crypt system, for which all layers have been defined.

The 18Crypt system is based on Digital Rights Management (DRM) methods defined by the Open Mobile Alliance (OMA) [OMA DRM]. As the unambiguous device key it uses a public encryption key whose link to a specific device is authenticated by a digital certificate. What is termed a Rights Issuer (RI) checks the digital device certificate's validity for authenticating and registering the device at the Registration layer. If the check is successful the RI will send the device what is termed a Rights Object (RO) at the Rights Management layer. The RO contains a Service or Program Encryption Key (SEK/PEK) that has been encrypted with the aid of the checked, public device key. Only the device specified in the digital certificate has the corresponding private device key. It will hence be the only device that can decrypt the encrypted SEK or PEK in that Rights Object RO.

Alongside the SEK or PEK the Rights Object RO as a rule also contains the description of rights granted to the device in terms of the data content of the broadcast service for which the device has registered (for example: Video is allowed to be played by the terminal five times). A change-protected program (DRM Agent) on the terminal is responsible for decrypting the SEK or PEK, for adhering to the rights granted to the device in terms of specific data content, and for protecting the SEK or PEK against unauthorized access. The SEK or PEK is used at the Key Stream layer for encrypting and decrypting frequently changing Traffic Encryption Keys (TEK).

IP-based broadcast and multicast services are realized with the aid of the Broadcast Multicast Service (BCMCS) in mobile radio networks conforming to the standards of the Third Generation Partnership Project 2 (3GPP2) [3GPP2 BCMCS]. 3GPP2 user terminals (Mobile Station—MS) have a User Identity Module (UIM) and the actual mobile device (Mobile Equipment—ME). A UIM can be either permanently linked to the ME or removable (Removable UIM-R-UIM). Whereas UIMs have a protected memory area but only little computing power, the mobile device ME has more computing power but no protected memory area.

The Secure Real-time Transport Protocol (SRTP) can be used for encrypting the broadcast/multicast data content. The keys serving as the input for SRTP encrypting are called Short-term Keys (SK). Like 3GPP MBMS Traffic Keys (MTK) they change frequently but are not, like MTKs, sent encrypted to the mobile stations MS. An encrypted Broadcast Access Key (BAK) is instead sent to the mobile terminals or MSs together with a random number SK_RAND and the mobile terminals BEG or MS compute the key SK from the BAK and SK_RAND. The BAK is not an MS-specific or UIM-specific key; rather it is the case that the BAK is valid for one or more IP multicast message flows. The BAKs are generated by the network component BAK Distributor (BAKD).

A BAK is encrypted on its way to a mobile terminal BEG or MS with the aid of a Temporary Encryption Key (TK). Each TK depends on a random number TK_RAND and on what is termed a Registration Key (RK). The RK is therein unambiguous for each UIM and known only to the relevant UIM and the network component responsible for generating TKs (Subscription Manager—SM). Along with the BAK encrypted by the TK, the mobile terminal also receives the random value TK_RAND. Only the mobile terminal having on its UIM the RK that was used for generating the TK will then be able to derive the key TK with the aid of TK_RAND. The TK is used by the mobile terminal to decrypt the BAK. The MS or BEG will then be able to compute the SK with the aid of the BAK and SK_RAND and hence decrypt the encrypted multicast data.

3GPP2 BC MCS's security is based on the following key hierarchy:
Registration Key (RK)
unambiguous for each UIM
known only to the UIM and Subscription Manager (SM)
Temporary Encryption Key (TK)
derived from the RK and a random number TK_RAND
serves to encrypt a Broadcast Access Key (BAK)
the MS receives the TK_RAND together with the encrypted BAK
only the MS having the correct RK is able to compute the TK with the aid of the TK_RAND
Broadcast Access Key (BAK)
generated by the BAK Distributor (BAKD) for one or more IP multicast message flows
the MS receives the BAK encrypted by the TK along with a random number SK_RAND
Short-term Keys (SK)
keys for encrypting (SRTP) broadcast/multicast data
not sent to the MS but computed by the MS from the BAK and SK_RAND The Broadcast (BCAST) Sub-Working Group of the Browser and Content (BAC) Working Group of the Open Mobile Alliance (OMA) standardizing body is standardizing what is termed an Enabler for Mobile Broadcast Services that are offered over networks having a unidirectional broadcast channel (for example DVB-H) and an optional, bidirectional unicast channel (for example 3GPP) [OMA BCAST ARC]. What is being specified therein are functions such as Service Guide, File Distribution, Stream Distribution, Service Protection, Content Protection, Service Interaction, Service Provisioning, Terminal Provisioning, and Notification.

In the current draft specifications, OMA BAC BCAST supports in particular 3GPP MBMS, DVB-H IPDC, and 3GPP2 BCMCS as broadcast distribution systems. The protection of broadcast services (Services) and content (Content) has been defined in [OMA BCAST SCP] and is offered in three variants: A DRM profile that is based on the OMA specifications for Digital Rights Management [OMA DRM] and two smartcard profiles based respectively on 3GPP (U)SIM and 3GPP2 (R)UIM.

Owing to the different access technologies and in particular to the different key hierarchies employed for the various access technologies, the problem of interrupted data transmission arises when a mobile terminal BEG changes over from a first service access network to a second service access network.

Changeover from one service access network to another service access network can take place owing either to a mobile terminal's moving out of a first service access network's transmission area into a second service access network's transmission area or to the user's wishing to change over from a first service access network to another service access network.

SUMMARY

An aspect is therefore to provide a method and system for transmitting encrypted data of a broadcast service that together will ensure continuous transmitting of a broadcast service's data to a mobile terminal even if the service access network is changed over.

Described below is a method for continuously transmitting encrypted data of a broadcast service from service access networks having different key hierarchies to a mobile terminal (BEG), with the terminal, on changing over from a first service access network DZN-A from which it receives the broadcast service's data encrypted by a first data content encryption key MTK, TEK, SK to a second service access network DZN-B from which it receives the same broadcast service's data encrypted by a second data content encryption key MTK, TEK, SK, receiving a key—encrypted by a user-specific key MUK, K-PUB, TK of the first service access network DZN-A—of the key hierarchy of the second service access network DZN-B.

In an embodiment variant of the method the user-specific key (MUK, TK) is generated directly after the mobile terminal (BEG) has been authenticated to an access control server (ZKS-A) of the first service access network (DZN-A).

In one embodiment variant of the method the mobile terminal (BEG) and the access control server (ZKS-A) of the first service access network (DZN-A) both have the user-specific key.

In an embodiment variant of the method the mobile terminal BEG receives the broadcast service's data encrypted by the first data content encryption key from a first access control server ZKS-A of the first service access network DZN-A.

In an embodiment variant of the method the mobile terminal BEG receives the broadcast service's data encrypted by the second data content encryption key from a second access control server ZKS-B of the second service access network DZN-B.

In an embodiment variant of the method the key encrypted by the user-specific key is transmitted from the access control server ZKS-A of the first service access network DZN-A to the mobile terminal BEG and decrypted by the mobile terminal BEG by the user-specific key known to the mobile terminal.

In one embodiment variant of the method, by the key that has been decrypted the mobile terminal BEG decrypts the second data content encryption key in order therewith to decrypt the broadcast service's data received from the second access control server ZKS-B and encrypted by the second data content encryption key.

In one embodiment variant of the method the mobile terminal BEG requests a changeover from the first service access network DZN-A to the second service access network DZN-B from the access control server of the first service access network ZKS-A by a request message.

In one embodiment variant of the method the request message has a user identity, an identity of the access control server ZKS-B of the second service access network DZN-B, and an identity of the broadcast service.

In one embodiment variant of the method the access control server ZKS-A of the first service access network DZN-A transmits an access request message to the access control server ZKS-B of the second service access network DZN-B, which message contains the user identity, the identity of the broadcast service, and an identity of the access control server ZKS-A of the first service access network DZN-A.

In one embodiment variant of the method the access control server ZKS-B of the second service access network DZN-B sends back an access confirmation message to the access control server ZKS-A of the first service access network DZN-A, which message contains the user identity, the identity of the broadcast service, and a key of the key hierarchy of the second service access network.

In one embodiment variant of the method the access control server ZKS-A of the first service access network DZN-A transmits a changeover confirmation message to the mobile terminal BEG, which message contains an identity of the second access control server ZKS-B and an identity of the broadcast service.

In one embodiment variant of the method the access control server ZKS-A of the first service access network DZN-A transmits the key—encrypted by the user-specific key—of the second key hierarchy in a message to the mobile terminal BEG.

In one embodiment variant of the method the first service access network DZN-A is formed by a 3GPP, 3GPP2 or DVB-H service access network.

In one embodiment variant of the method the second service access network DZN-B is formed by a 3GPP, 3GPP2 or DVB-H service access network.

In one embodiment variant of the method, changeover from the first service access network DZN-A to the second service access network DZN-B will be performed automatically by the access control server ZKS-A of the first service access network DZN-A when the mobile terminal BEG moves out of a transmitting range of the first service access network DZN-A.

In one embodiment variant of the method the mobile terminal BEG is formed by a mobile telephone, a laptop or a PDA device.

In one embodiment variant of the method the data received by the mobile terminal BEG is formed by multimedia data.

Also described below is a system for continuously transmitting encrypted data of a broadcast service to a mobile terminal BEG from service access networks DZN that have different key hierarchies, having a first access control server ZKS-A of a first service access network DZN-A that has a first key hierarchy, with the mobile terminal BEG receiving the broadcast service's data encrypted by a first data content encryption key from the first access control server ZKS-A of the first service access network DZN-A, and having a second access control server ZKS-B of a second service access network DZN-B that has a second key hierarchy, with the mobile terminal BEG receiving the broadcast service's data encrypted by a second data content encryption key from the second access control server ZKS-B of the second service access network DZN-B, with the mobile terminal BEG receiving a key—encrypted by a user-specific key of the first service access network DZN-A—of the key hierarchy of the second service access network DZN-B on changing over from the first service access network DZN-A to the second service access network DZN-B.

Further, described below is an access control server ZKS for provisioning a continuous broadcast service for a mobile terminal BEG, with the access control server ZKS transmitting a key—encrypted by a user-specific key of the service access network DZN key—of the second service access network DZN-B to the mobile terminal BEG when the terminal changes over from a service access network DZN of the access control server ZKS to another service access network DZN'.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a layer model of known access technology for protecting data content in the case of broadcast services according to the related art;

FIG. 2 is a block diagram of a possible embodiment variant of the system for continuously transmitting encrypted data;

FIG. 3 is a signal chart for elucidating a first embodiment variant of the method for continuously transmitting encrypted data of a broadcast service;

FIG. 4 is another signal chart for elucidating a second embodiment variant of the method for continuously transmitting encrypted data of a broadcast service;

FIG. 5 is another signal chart for elucidating a third embodiment variant of the method for continuously transmitting encrypted data of a broadcast service;

FIG. 6 is another signal chart for elucidating a fourth embodiment variant of the method for continuously transmitting encrypted data of a broadcast service;

FIG. 7 is another signal chart for presenting a fifth embodiment variant of the method for continuously transmitting encrypted data of a broadcast service;

FIG. 8 is another signal chart for presenting a sixth embodiment variant of the method for continuously transmitting encrypted data of a broadcast service.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

As can be seen from FIG. 2, a system for continuously transmitting encrypted data of a broadcast service has at least two service access networks DZN. One of the service access networks contains a plurality of base stations BS via which a mobile terminal or user terminal BEG can exchange data with the service access network DZN over an air interface. The base stations BS of the service access network DZN are, for example, connected to a gateway GW of the service access network. The gateway links the service access network DZN to a core network CN. Located in the CN is an access control server ZKS that controls access to multicast or broadcast services in its respective area of responsibility. The access control servers ZKS are, for example, connected to a Content Provider Server CPS that provisions multimedia data for a multicast or broadcast service. The broadcast services can be, for example, the provisioning of audio, video or voice services (streaming services), but also, for instance, services with the aid of which images and text can be radiated to the mobile terminals BEG.

The two service access networks DZN-A, DZN-B can in the system have different access technologies. For example the first service access network DZN-A can be a 3GPP, 3GPP2 or DVB-H service access network. The second service access network DZN-B can in the same way likewise be a 3GPP, 3GPP2 or DVB-H service access network. The system enables the mobile terminal BEG to change over seamlessly from the area of responsibility of the first access control server ZKS-A, which is to say from the service access network DZN-A, to the area of responsibility of the second access control server ZKS-B, which is to say to the service access network DZN-B. Changeover from a first service access network DZN-A to the second service access network DZN-B can be performed automatically by, for example, the access control servers ZKS when a mobile terminal BEG moves out of the transmitting range of the base station BS of the first service access network DZN-A and reaches the transmitting domain of the base station BS of the second service access network DZN-B. For that purpose for example signal strengths of the exchanged messages are monitored and changeover automatically initiated by the access control servers ZKS if the signal amplitudes in the first service access network DZN-A fall below a certain threshold. Changeover from one service access network DZN-A to another service access network DZN-B having the same or an alternative access technology can alternatively be initiated by the user of the mobile terminal BEG by setting a corresponding switchover on the mobile terminal BEG.

If, for instance, a user of a mobile terminal BEG, for example a mobile telephone, wishes to view a cinema film or television film offered by the Content Provider CPS on his/her display, he/she can register for that broadcast service via the first service access network DZN-A. He/she first undergoes an authentication procedure and, in keeping with the key hierarchy of the access technology of the service access network DZN-A, obtains keys for decrypting the encrypted media data that allow him/her to decrypt the encrypted media data on receiving it. The keys may therein themselves be transmitted in encrypted form to prevent eavesdropping. On completion of that procedure the mobile terminal BEG will be able to receive and decrypt the data stream via the first service access network DZN-A. If the user, along with his/her mobile terminal, then moves outside the range of the first service access network DZN-A into the transmitting domain of another service access network DZN-B having another access technology, for example, then by the system there will be a continuous and for the user not consciously perceptible changeover from the first service access network DZN-A to the second service access network DZN-B without the need for the user terminal BEG and second access control server to undergo complete, complex, and for the user tedious service registering. Changeover from a first service access network DZN-A to a service access network DZN-B will take place in the same way if the user performs a corresponding switchover operation on his/her mobile terminal BEG, for example in order to save on charges if data transmission over the second service access network DZN-B is more economical for him/her.

The user's mobile terminal BEG first receives the data of the broadcast service, for example of the film the user wants, encrypted by a first data content encryption key from the first access control server ZKS-A of the first service access network DZN-A.

When the mobile terminal BEG changes over from the first service access network DZN-A to the second service access network DZN-B, the mobile terminal BEG receives a key—encrypted by a user-specific key of the first service access network—of the second service access network DZN-B.

Thereupon, or after changeover, the mobile terminal BEG next receives the data of the same broadcast service with a second data content encryption key from the second access control server ZKS-B of the second service access network DZN-B in encrypted form.

In the system the two access control servers ZKS-A, ZKS-B are interconnected via a common interface INT and exchange messages with each other. The messages contain data such as, for example, identifiers for the mobile terminal BEG, for the user himself/herself, for the area of responsibility of the first and second access control servers ZKS-A, ZKS-B, and for one or more broadcast services, as well as cryptographic keys and details of their length of validity.

In the method the mobile terminal BEG first authenticates itself to the first access control server ZKS-A of the first service access network DZN-A.

The first access control server ZKS-A then receives a key directly from the second access control server ZKS-B or indirectly from a key server to which the second access control server ZKS-B has previously transferred the key.

The key that has been received is then encrypted by the first access control server ZKS-A with the aid of a secret, symmetric key, for example a user-specific key that is known only to the mobile terminal BEG and first access control server ZKS-A of the first service access network DZN-A and was generated based on the procedure for authenticating the mobile terminal BEG to the first access control server ZKS-A. The first access control server ZKS-A alternatively encrypts the received key with the aid of a public, asymmetric key whose association with the mobile terminal BEG is checked by the first access control server ZKS-A while the mobile terminal BEG is being authenticated.

The first access control server ZKS-A then transmits the key encrypted by the secret symmetric key or the public asymmetric key to the mobile terminal BEG.

The mobile terminal BEG decrypts the encrypted key with the aid of the secret symmetric key or with the aid of the secret, asymmetric key belonging to the public asymmetric key in order to decrypt the keys for encrypting the broadcast service's data content with the aid of the thus decrypted key.

Following FIGS. 4 to 8 show six different embodiment variants of the method for continuously transmitting encrypted data of a broadcast service from service access networks DZN having different key hierarchies to the mobile terminal BEG.

The six exemplary embodiments in FIGS. 3 to 8 show different case constellations in which the service access networks DZN-A, DZN-B are a 3GPP, 3GPP2 or DVB-H service access network.

In the case constellation shown in FIG. 3 the mobile terminal BEG changes over from a 3GPP service access network to a DVB-H service access network.

On successful completion of the 3GPP GBA authentication procedure the user terminal BEG and access control server ZKS_A will be in possession of the key Ks_NAF from which are derived the keys MBMS Request Key (MRK) and MBMS User Key (MUK). The BEG authenticates itself to the ZKS_A with the aid of the MRK and registers for the multicast service ID_SVC that is within the area of responsibility of the ZKS_A. Because the BEG has successfully registered for the multicast service ID_SVC with the ZKS_A, the ZKS_A sends the MBMS Service Key (MSK) belonging to the service to the BEG, specifically encrypted with the aid of the MBMS User Key (MUK) of the BEG. The BEG is able to decrypt the message Encrypt [MUK] (MSK) with the aid of the MUK and hence also to decrypt the MBMS Traffic Keys (MTK), which are sent to the user terminals—encrypted with the aid of the MSK. The decrypted MTKs will then allow the BEG to decrypt the specific multicast service (Content) that has been encrypted with the aid of the MTKs and is identified by ID_SVC. The BEG initiates handover from the area of responsibility of the ZKS_A to the ZKS_B by sending a handover request (HORequest=Handover Request) to the ZKS_A. That message advantageously contains the identity ID_BEG of the user terminal BEG or the user's ID_USER, the identity ID_ZKS_B of the ZKS_B, the identity ID_SVC' of a multicast service in the area of responsibility of the ZKS_B, and possibly also other relevant data.

For the user terminal's benefit the ZKS_A sends the ZKS_B an access control request (AccessRequest) which alongside the identities ID_BEG, ID_USER, ID_SVC', and ID_ZKS_A advantageously possibly also contains other relevant data. Based on the BEG's having already been successfully authenticated to the ZKS_A and registered there, the ZKS_B will be able without any re-authenticating or re-registering on the BEG's part to decide whether or not it wants to grant the BEG access to the multicast service ID_SVC'. If the ZKS_B grants the user terminal BEG access to the desired multicast service ID_SVC' it will send an access-granting message (AccessAccept) to the ZKS_A along with the Service or Program Encryption Key (SEK/PEK) belonging to the desired multicast service ID_SVC'. Because the ZKS_B has granted the user terminal BEG access to the desired multicast service, the ZKS_A sends a handover-granting message (HOAccept=Handover Accept) to the BEG. The message advantageously contains the identities ID_ZKS_B and ID_SVC' of the access control server ZKS_B and desired service, respectively.

The ZKS_A sends the BEG the key SEK or PEK that it has received from the ZKS_B, moreover specifically encrypted by the MUK. The BEG is able to decrypt the SEK or PEK because it knows the key MUK. Knowing the SEK or PEK, the BEG will hence be able to decrypt the Traffic Encryption Keys (TEKs) encrypted by the SEK or PEK. The decrypted TEKs will then allow the BEG to decrypt the specific multicast service (Content) that has been encrypted with the aid of the TEKs and is identified by ID_SVC'.

FIG. 4 shows a second case constellation in which a mobile terminal BEG changes over from a DVB-H service access network to a 3GPP service access network.

The BEG authenticates itself to the ZKS_A with the aid of its Public Key Certificate and registers for the multicast service ID_SVC that is within the area of responsibility of the ZKS_A. Because BEG has successfully registered for the multicast service ID_SVC with ZKS_A, ZKS_A sends the Service or Program Encryption Key (SEK/PEK) belonging to the service to the BEG. The SEK/PEK is therein contained in a Rights Object RO and is present there in encrypted form. The public key K_PUB of the BEG is used for encrypting. With the aid of its private device key K_PRIV the BEG is able to decrypt the key SEK or PEK and hence also the Traffic Encryption Keys (TEK), which are sent to the user terminals encrypted with the aid of the SEK or PEK. The decrypted TEKs will then allow the BEG to decrypt the specific multicast service (Content) that has been encrypted with the aid of the TEKs and is identified by ID_SVC. The BEG initiates handover from the area of responsibility of the ZKS_A to the ZKS_B by sending a handover request (HORequest=Handover Request) to the ZKS_A. That message advantageously contains the identity ID_BEG of the user terminal or the user's ID_USER, the identity ID_ZKS_B of the ZKS_B, the identity ID_SVC' of a multicast service in the area of responsibility of the ZKS_B, and possibly also other relevant data. For the user terminal's benefit the ZKS_A sends the ZKS_B an access control request (AccessRequest) which alongside the identities ID_BEG, ID_USER, ID_SVC', and ID_ZKS_A advantageously possibly also contains other relevant data. Based on the BEG's having already been successfully authenticated to the ZKS_A and registered there, the ZKS_B will be able without any re-authenticating or re-registering on the BEG's part to decide whether or not it wants to grant the BEG access to the multicast service ID_SVC'. If the ZKS_B grants the user terminal BEG access to the desired multicast service ID_SVC' it will send an access-granting message (AccessAccept) to the ZKS_A along with the Service or Program Encryption Key (SEK/PEK) belonging to the desired multicast service ID_SVC'. Because the ZKS_B has granted the user terminal BEG access to the desired multicast service, the ZKS_A sends a handover-granting message (HOAccept=Handover Accept) to the BEG. The message advantageously contains the identities ID_ZKS_B and ID_SVC' of the access control server ZKS_B and desired service, respectively. The ZKS_A sends the BEG the key MSK that it has received from the ZKS_B, moreover specifically encrypted with the aid of K_PUB, as part of a Rights Object RO. Using its private device key K_PRIV the BEG is able to decrypt the key MSK. Knowing the MSK, the BEG will hence be able to decrypt the MBMS Traffic Keys (MTKs) encrypted by the MSK. The decrypted MTKs will then allow the BEG to decrypt the specific multicast service (Content') that has been encrypted with the aid of the MTKs and is identified by ID_SVC'.

FIG. 5 shows a third case constellation in which a mobile terminal BEG changes over from a 3GPP service access network to a 3GPP2 service access network.

On successful completion of the 3GPP GBA authentication procedure the user terminal BEG and access control server ZKS_A will be in possession of the key Ks_NAF from which are derived the keys MBMS Request Key (MRK) and MBMS User Key (MUK). The BEG authenticates itself to the ZKS_A with aid of the MRK and registers for the multicast service ID_SVC that is within the area of responsibility of the ZKS_A. Because the BEG has successfully registered for the multicast service ID_SVC with the ZKS_A, the ZKS_A sends the MBMS Service Key (MSK) belonging to the service to the BEG, specifically encrypted with the aid of the MBMS User Key (MUK) of the BEG. The BEG is able to decrypt the message Encrypt [MUK] (MSK) with the aid of the MUK and hence also the MBMS Traffic Keys (MTK), which are sent to the user terminals—encrypted with the aid of the MSK. The decrypted MTKs will then allow the BEG to decrypt the specific multicast service (Content) that has been encrypted with the aid of the MTKs and is identified by ID_SVC. The BEG initiates handover from the area of responsibility of the ZKS_A to the ZKS_B by sending a handover request (HORequest=Handover Request) to the ZKS_A. That message advantageously contains the identity ID_BEG of the user terminal BEG or the user's ID_USER, the identity ID_ZKS_B of the ZKS_B, the identity ID_SVC' of a multicast service in the area of responsibility of the ZKS_B, and possibly also other relevant data. For the user terminal's benefit the ZKS_A sends the ZKS_B an access control request (AccessRequest) which alongside the identities ID_BEG, ID_USER, ID_SVC', and ID_ZKS_A advantageously possibly also contains other relevant data. Based on the BEG's having already been successfully authenticated to the ZKS_A and registered there, the ZKS_B will be able without any re-authenticating or re-registering on the BEG's part to decide whether or not it wants to grant the BEG access to the multicast service ID_SVC'. If the ZKS_B grants the user terminal BEG access to the desired multicast service ID_SVC' it will send an access-granting message (AccessAccept) to the ZKS_A along with the Broadcast Access Key (BAK) belonging to the desired multicast service ID_SVC'. Because the ZKS_B has granted the user terminal BEG access to the desired multicast service, the ZKS_A sends a handover-granting message (HOAccept=Handover Accept) to the BEG. The message advantageously contains the identities ID_ZKS_B and ID_SVC' of the access control server ZKS_B and desired service, respectively. The ZKS_A sends the BEG the key BAK that it has received from the ZKS_B, moreover specifically encrypted by the MUK. The BEG is able to decrypt the BAK because it knows the key MUK. The BEG obtains the multicast service that has been identified by ID-SVC' and encrypted with the aid of Short-term Keys (SK). Alongside the encrypted multicast service the BEG also obtains the non-encrypted random values SK_RAND. The BEG is able to compute the Short-term Keys SK using the BAK and the random numbers SK_RAND and hence decrypt the multicast service (Content').

FIG. 6 shows another case constellation in which a mobile terminal BEG changes over from a 3GPP2 service access network to a 3GPP service access network.

The BEG authenticates itself to the ZKS_A with the aid of an authentication key (Auth-Key) derived from its registration key (RK). The BEG registers for the multicast service ID_SVC that is within the area of responsibility of the ZKS_A. The BEG obtains the Broadcast Access Key (BAK) belonging to the multicast service ID_SVC, moreover specifically encrypted with the aid of a Temporary Key (TK). Alongside that, the BEG also receives the value TK_RAND and will then be able to compute the key TK from the RK and TK_RAND and hence decrypt the BAK. The BEG receives the random values SK_RAND from which it can determine the values of the Short-term Keys (SK) with the aid of the BAK. The BEG will hence be able to decrypt the specific multicast service (Content) that has been encrypted with the aid of the SKs and is identified by ID_SVC. The BEG initiates handover from the area of responsibility of the ZKS_A to the ZKS_B by sending a handover request (HORequest=Handover Request) to the ZKS_A. That message advantageously contains the identity ID_BEG of the user terminal BEG or the user's ID_USER, the identity ID_ZKS_B of the ZKS_B, the identity ID_SVC' of a multicast service in the area of responsibility of the ZKS_B, and possibly also other relevant data. For the user terminal's benefit the ZKS_A sends the ZKS_B an access control request (AccessRequest) which alongside the identities ID_BEG, ID_USER, ID_SVC', and ID_ZKS_A advantageously possibly also contains other relevant data. Based on the BEG's having already been successfully authenticated to the ZKS_A and registered there, the ZKS_B will be able without any re-authenticating or re-registering on the BEG's part to decide whether or not it wants to grant the BEG access to the multicast service ID_SVC'. If the ZKS_B grants the user terminal access to the desired multicast service ID_SVC' it will send an access-granting message (AccessAccept) to the ZKS_A along with the MBMS Service Key MSK belonging to the desired multicast service ID_SVC'. Because the ZKS_B has granted the user terminal BEG access to the desired multicast service, the ZKS_A sends a handover-granting message (HOAccept=Handover Accept) to the BEG. The message advantageously contains the identities ID_ZKS_B and ID_SVC' of the access control server ZKS_B and desired service, respectively. The ZKS_A sends the BEG the key MSK that it has received from the ZKS_B, moreover specifically encrypted with the aid of the Temporary Key TK. The BEG is able to decrypt the key MSK because it knows the key TK. Knowing the MSK, the BEG will hence be able to decrypt the MBMS Traffic Keys (MTKs) encrypted by the MSK. The decrypted MTKs will then allow the BEG to decrypt the specific multicast service (Content') that has been encrypted with the aid of the MTKs and is identified by ID_SVC'.

FIG. 7 shows another case constellation in which a mobile terminal BEG changes over from a 3GPP2 service access network to a DVB-H service access network.

The BEG authenticates itself to the ZKS_A with the aid of an authentication key (Auth-Key) derived from its registration key (RK). The BEG registers for the multicast service ID_SVC that is within the area of responsibility of the ZKS_A. The BEG obtains the Broadcast Access Key (BAK) belonging to the multicast service ID-SVC, moreover specifically encrypted with the aid of a Temporary Key (TK). Alongside that, the BEG also receives the value TK_RAND and will then be able to compute the key TK from the RK and TK_RAND and hence decrypt the BAK. The BEG receives the random values SK_RAND from which it can determine the values of the Short-term Keys (SK) with the aid of the BAK. The BEG will hence be able to decrypt the specific multicast service (Content) that has been encrypted with the aid of the SKs and is identified by ID_SVC. The BEG initiates handover from the area of responsibility of the ZKS_A to the ZKS_B by sending a handover request (HORequest=Handover Request) to the ZKS_A. That message advantageously contains the identity ID_BEG of the user terminal BEG or the user's ID_USER, the identity ID_ZKS_B of the ZKS_B, the identity ID_SVC' of a multicast service in the area of responsibility of the ZKS_B, and possibly also other relevant data. For the user terminal's benefit the ZKS_A sends the ZKS_B an access control request (AccessRequest) which alongside the identities ID_BEG, ID_USER, ID_SVC', and ID_ZKS_A advantageously possibly also contains other relevant data. Based on the BEG's having already been successfully authenticated to the ZKS_A and registered there, the ZKS_B will be able without any re-authenticating or re-registering on the BEG's part to decide whether or not it wants to grant the BEG access to the multicast service ID_SVC'. If the ZKS_B grants the user terminal access to the desired multicast service ID_SVC it will send an access-granting message (AccessAccept) to the ZKS_A along with the Service or Program Encryption Key (SEK/PEK) belonging to the desired multicast service ID_SVC'. Because the ZKS_B has granted the user terminal BEG access to the desired multicast service, the ZKS_A sends a handover-granting message (HOAccept=Handover Accept) to the BEG. The message advantageously contains the identities ID_ZKS_B and ID_SVC' of the access control server ZKS_B and desired service, respectively. The ZKS_A sends the BEG the key SEK or PEK that it has received from the ZKS_B, moreover specifically encrypted with the aid of the Temporary Key TK. The BEG is able to decrypt the key SEK or PEK because it knows the key TK. Knowing the SEK or PEK, the BEG will then be able to decrypt the Traffic Encryption Keys (TEKs) encrypted by the SEK or PEK. The decrypted TEKs will then allow the BEG to decrypt the specific multicast service (Content') that has been encrypted with the aid of the TEKs and is identified by ID_SVC'.

FIG. 8 shows another case constellation in which a mobile terminal changes over from a DVB-H service access network to a 3GPP2 service access network.

The BEG authenticates itself to the ZKS_A with the aid of its Public Key Certificate and registers for the multicast service ID_SVC that is within the area of responsibility of the ZKS_A. Because the BEG has successfully registered for the multicast service ID_SVC with the ZKS_A, the ZKS_A sends the Service or Program Encryption Key (SEK/PEK) belonging to the service to the BEG. The SEK/PEK is therein contained in a Rights Object RO and is present there in encrypted form. The public key K_PUB of the BEG is used for encrypting. With the aid of its private device key K_PRIV the BEG is able to decrypt the key SEK or PEK and hence also the Traffic Encryption Keys (TEK), which are sent to the user terminals encrypted with the aid of the SEK or PEK. The decrypted TEKs will then allow the BEG to decrypt the specific multicast service (Content) that has been encrypted with the aid of the TEKs and is identified by ID_SVC. The BEG initiates handover from the area of responsibility of the ZKS_A to the ZKS_B by sending a handover request (HORequest=Handover Request) to the ZKS_A. That message advantageously contains the identity ID_BEG of the user terminal or the user's ID_USER, the identity ID_ZKS_B of the ZKS_B, the identity ID_SVC' of a multicast service in the area of responsibility of the ZKS_B, and possibly also other relevant data. For the user terminal's benefit the ZKS_A sends the ZKS_B an access control request (AccessRequest) which alongside the identities ID_BEG, ID_USER, ID_SVC', and ID_ZKS_A advantageously possibly also contains other relevant data. Based on the BEG's having already been successfully authenticated to the ZKS_A and registered there, the ZKS_B will be able without any re-authenticating or re-registering on the BEG's part to decide whether or not it wants to grant the BEG access to the multicast service ID_SVC'. If the ZKS_B grants the user terminal access to the desired multicast service ID_SVC' it will send an access-granting message (AccessAccept) to the ZKS_A along with the Broadcast Access Key (BAK) belonging to the desired multicast service ID_SVC'. Because the ZKS_B has granted the user terminal BEG access to the desired multicast service, the ZKS_A sends a handover-granting message (HOAccept=Handover Accept) to the BEG. The message advantageously contains the identities ID_ZKS_B and ID_SVC' of the access control server ZKS_B and desired service, respectively. The ZKS_A sends the BEG the key BAK that it has received from the ZKS_B, moreover specifically encrypted by K_PUB, the public device key of BEG. The BEG is able to decrypt the BAK because it knows the private device key K_PRIV belonging to K_PUB. The BEG obtains the multicast service that has been identified by ID-SVC' and encrypted with the aid of Short-term Keys (SK). Alongside the encrypted multicast service the BEG also obtains the non-encrypted random values SK_RAND. The BEG is able to compute the Short-term Keys SK using the BAK and the random numbers SK_RAND and hence decrypt the multicast service (Content').

In the exemplary embodiments shown in FIGS. 3 to 8 the user terminal BEG initiates handover or changeover from the first service access network DZN-A to the second service access network DZN-B. In alternative embodiment variants the changeover is initiated by the access control server ZKS-A or ZKS_B.

In the exemplary embodiments shown the user terminal BEG first receives a broadcast service that is within the area of responsibility of the first access control server ZKS-A. That, though, is not absolutely necessary. It is necessary only for the user terminal BEG to authenticate itself to the first access control server ZKS-A and register there.

The data content of the broadcast or multicast service for which the user terminal BEG wishes to perform a handover to the area of responsibility of the second access control server ZKS-B, which is to say the broadcast service identified by ID_SVC', can either be the same as the data content belonging to the broadcast service ID_SVC or it can belong to another broadcast service. The method can hence be employed in a two-fold manner: On the one hand changing over of the broadcast-access technology is not associated with changing over at the application level; on the other hand changing over of the broadcast access technology is associated with changing over at the application level.

In the exemplary embodiments shown in FIGS. 3 to 8 the access confirmation messages (AccessAccept) sent by the second access control server ZKS-B to the first access control server ZKS-A obtain the keys (MSK, SEK/PEK, BAK) knowledge of which will enable decrypting of a broadcast service. The messages may therefore be protected by suitable measures, for example by being encrypted to prevent unauthorized eavesdropping. It is alternatively also possible to dispense with the key (MSK, SEK/PEK or BAK) in the access confirmation message (AccessAccept) and instead send an identifier for the key that will enable the first access control server ZKS-A to interrogate the associated key from a database in which the key is stored.

If the first service access network DZN-A is a 3GPP service access network then the second access technology's service-specific key, which is to say the SEK/PEK in the case of DVB-H 18Crypt and the BAK in the case of 3GPP2 BCM-SCS, will be encrypted directly by the MUK, the user-specific MBMS user key, and sent to the user terminal BEG. If the application area of the user-specific key MUK is not intended to be extended in that way, then in one embodiment variant the key MUK will be used only as an input for computing a new key K that will serve in place of the user-specific key MUK to encrypt the SEK/PEK or BRK. Computing of the key K therein also depends in one embodiment variant on further data such as, for example, the identity of the second access control server ZKS-B, the IP address thereof, and a random number. Another possibility for computing the key is presented by key-dependent HASH functions.

The access control servers ZKS-A, ZKS-B assume a plurality of functions in the system, for example authenticating, registering, key distributing, data encrypting, and receiving and sending messages for transferring access control functions. The functions are in an alternative embodiment variant of the system not assumed by a single server but can instead be distributed among different servers.

Interoperating between the access control servers ZKS-A, ZKS-B controlling access to broadcast services supports faster and user-friendlier changeover from one broadcast access technology to another without the need for a user of a mobile terminal BEG to re-authenticate himself/herself in each case to each access control server ZKS and re-register there in its area of responsibility wishing to receive the broadcast service.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir 2004).

The invention claimed is:

1. A method to continuously transmit encrypted data of a broadcast service from service access networks having different key hierarchies to a mobile terminal, comprising:
   receiving, at the mobile terminal broadcast service, data of the broadcast service encrypted by a first data content encryption key, upon changing from a first service access network to a second service access network;
   providing the broadcast service data encrypted by a second data content encryption key, and receiving by the mobile terminal an encrypted key of the key hierarchy of the second service access network, the encrypted key being encrypted by a user-specific key of the first service access network; and
   sending, from the mobile terminal to the access control server of the first service access network, a changeover request message requesting a changeover from the first service access network to the second service access network, and
   wherein the request message includes a user identity, an identity of the access control server of the second service access network, and an identity of the broadcast service, and
   the changeover request message is used to enable the continuous transmission of the broadcast service via the second service access network without requiring authentication to the second service access network.

2. The method as claimed in claim 1, comprising transmitting an access request message, from the access control server of the first service access network to the access control server of the second service access network, the access request message including the user identity, the identity of the broadcast service, and an identity of the access control server of the first service access network.

3. The method as claimed in claim 2, comprising transmitting an access confirmation message, from the access control server of the second service access network to the access control server of the first service access network, the access confirmation message including the user identity, the identity of the broadcast service, and a key of the key hierarchy of the second service access network.

4. The method as claimed in claim 3, comprising transmitting a changeover confirmation message from the access control server of the first service access network to the mobile terminal, the changeover confirmation message including an identity of the second access control server and an identity of the broadcast service.

5. The method as claimed in claim 4, comprising transmitting the encrypted key in a message from the access control server of the first service access network to the mobile terminal.

6. The method as claimed in claim 1, comprising generating the user-specific key directly after the mobile terminal has been authenticated to an access control server of the first service access network.

7. The method as claimed in claim 1, wherein the mobile terminal and the access control server of the first service access network both have the user-specific key.

8. The method as claimed in claim 1, comprising receiving at the mobile terminal the broadcast service data encrypted by the first data content encryption key from a first access control server of the first service access network.

9. The method as claimed in claim 1, comprising receiving at the mobile terminal the broadcast service data encrypted by the second data content encryption key from a second access control server of the second service access network.

10. The method as claimed in claim 1, comprising:
    transmitting the encrypted key encrypted by the user-specific key from an access control server of the first service access network to the mobile terminal; and
    decrypting the encrypted key by the mobile terminal using the user-specific key known to the mobile terminal to obtain a decrypted key.

11. The method as claimed in claim 10, comprising:
    deriving the second data content encryption key using the decrypted key; and
    decrypting the broadcast service data received from the second access control server which is encrypted by the second data content encryption key.

12. The method as claimed in claim 1, wherein the first service access network is formed by a 3GPP, 3GPP2 or DVB-H service access network.

13. The method as claimed in claim 1, wherein the second service access network is formed by a 3GPP, 3GPP2 or DVB-H service access network.

14. The method as claimed in claim 1, comprising automatically performing changeover from the first service access network to the second service access network by the access control server of the first service access network when the mobile terminal moves out of a transmitting range of the first service access network.

15. The method as claimed in claim 1, wherein the mobile terminal is one of a mobile telephone, a laptop and a PDA device.

16. The method as claimed in claim 1, wherein the encrypted data received by the mobile terminal is multimedia data.

17. A system to continuously transmit encrypted data of a broadcast service to a mobile terminal from first and second service access networks that have different key hierarchies, comprising: a first access control server of the first service access network that has a first key hierarchy, sending to the mobile terminal broadcast service data encrypted by a first data content encryption key, encrypted by a user-specific key of the first service access network, and an encrypted key of a second key hierarchy of the second service access network, the encrypted key being encrypted by the user-specific key of the first service access network, upon changing from the first service access network to the second service access network; and
   a second access control server of the second service access network that has the second key hierarchy, sending to the mobile terminal the broadcast service data encrypted by a second data content encryption key, and the second data content encryption key is encrypted by the key of the key hierarchies from the second access control server of the second service access network, and
   wherein a changeover request message, requesting a changeover from the first service access network to the second service access network, is sent from the mobile terminal to the access control server of the first service access network, wherein the changeover request message includes a user identity, an identity of the access control server of the second service access network, and an identity of the broadcast service, and the changeover request message is used to enable the continuous transmission of the broadcast service via the second service access network without requiring authentication to the second service access network.

18. The system as claimed in claim 17, wherein the mobile terminal decrypts the encrypted key using the user-specific key known to the mobile terminal to obtain a decrypted key.

19. The system as claimed in claim 18, wherein the mobile terminal uses the decrypted key to decrypt or derive the second data content encryption key used to decrypt the broadcast service data received from the second access control server which is encrypted by the second data content encryption key.

20. An access control server in a service access network to provision continuous broadcast service for a mobile terminal by changing over transmission of broadcast service data to a second service access network, comprising a transmission unit transmitting to the mobile terminal an encrypted key of a key hierarchy of the second service access network which is encrypted by a user-specific key of the first service access network when the mobile terminal changes over from the first service access network to the second service access network, and wherein a changeover request message, requesting a changeover from the service access network to the second service access network, is sent from the mobile terminal to the access control server of the service access network, wherein the changeover request message includes a user identity, an identity of the access control server of the second service access network, and an identity of the broadcast service, and the changeover request message is used to enable the continuous transmission of the broadcast service via the second service access network without requiring authentication to the second service access network.

* * * * *